United States Patent
Kaushikkar et al.

(10) Patent No.: US 11,016,913 B1
(45) Date of Patent: May 25, 2021

(54) INTER CLUSTER SNOOP LATENCY REDUCTION

(71) Applicant: Apple Inc., Cupertino, CA (US)

(72) Inventors: Harshavardhan Kaushikkar, San Jose, CA (US); Christopher D. Shuler, Davis, CA (US); Srinivasa Rangan Sridharan, San Jose, CA (US); Yu Zhang, San Jose, CA (US); Kaushik Kannan, Mountain View, CA (US); Deniz Balkan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/834,148

(22) Filed: Mar. 30, 2020

(51) Int. Cl.
  *G06F 3/06* (2006.01)
  *G06F 13/16* (2006.01)
  *G06F 13/40* (2006.01)

(52) U.S. Cl.
  CPC ...... *G06F 13/1668* (2013.01); *G06F 13/4027* (2013.01)

(58) Field of Classification Search
  None
  See application file for complete search history.

(56) References Cited

U.S. PATENT DOCUMENTS

| | | | |
|---|---|---|---|
| 7,827,357 B2 | 11/2010 | Sistla | |
| 9,892,043 B2 | 2/2018 | Drapala et al. | |
| 2003/0217233 A1* | 11/2003 | Rowlands | G06F 12/0817 |
| | | | 711/141 |
| 2009/0276579 A1* | 11/2009 | Moyer | G06F 13/28 |
| | | | 711/141 |
| 2010/0250856 A1* | 9/2010 | Owen | G06F 12/084 |
| | | | 711/128 |
| 2013/0067284 A1* | 3/2013 | Berg | G06F 11/3636 |
| | | | 714/37 |
| 2015/0058663 A1* | 2/2015 | Schmidt | G06F 11/2033 |
| | | | 714/6.24 |
| 2015/0324288 A1* | 11/2015 | Rowlands | G06F 12/0817 |
| | | | 711/130 |
| 2017/0193142 A1* | 7/2017 | Boutillier | G06F 30/18 |
| 2018/0225213 A1 | 8/2018 | Hum et al. | |
| 2018/0293693 A1* | 10/2018 | Ray | G06T 1/20 |

OTHER PUBLICATIONS

Patterson, Lecture 18: Snooping vs. Directory Based Coherency, Fall 1996 (Year: 1996).*

* cited by examiner

*Primary Examiner* — Hyun Nam
(74) *Attorney, Agent, or Firm* — Kowert, Hood, Munyon, Rankin & Goetzel, P.C.; Lawrence J. Merkel

(57) ABSTRACT

In one embodiment, a cache coherent system includes one or more agents (e.g. coherent agents) that may cache data used by the system. The system may include a point of coherency in a memory controller in the system, and thus the agents may transmit read requests to the memory controller to coherently read data. The point of coherency may determine if the data is cached in another agent, and may transmit a copy back request to the other agent if the other agent has modified the data. The system may include an interconnect between the agents and the memory controller. At a point on the interconnect at which traffic from the agents converges, a copy back response may be converted to a fill for the requesting agent.

20 Claims, 8 Drawing Sheets

Computer Accessible Storage Medium 200

SOC
204

FIG. 8

INTER CLUSTER SNOOP LATENCY REDUCTION

BACKGROUND

Technical Field

Embodiments described herein are related to a cache coherent system and, more particularly, to reducing latency in the system.

Description of the Related Art

In digital systems such as various types of computing devices, caches are often employed to reduce the effective memory latency. Data can be placed in the cache, and if the data is accessed one or more times while it is in the cache, the latency is significantly lower than the latency to the main memory. However, once copies of data from main memory are stored in one or more caches, it is possible that one copy is updated with respect to the other and thus unexpected results could occur if various agents accessing the data expect to receive the most recent copy of the data (e.g. reflecting all previous updates). One way to ensure that the most recent copy of data from a given memory location is accessed is to provide a cache coherent system.

Cache coherent systems include mechanisms to detect when an agent is updating data that might be cached in another agent, and ensuring that the update is visible to the other agent. For example, an agent can invalidate its copy when the other agent updates the cached data, so that a subsequent access by the agent to the data will miss in the cache and the updated copy will be read. Additionally, an agent that has modified the data in its cache needs to provide the modified data in response to a request for the data so that requestor receives the updates previously made by that agent.

In some cases, maintaining cache coherency when a modified copy is cached can result in higher latency for the accessing agent. For example, the modified copy is often written back to the main memory before the newly-accessing agent is permitted to read the data. The latency to detect that the modified copy exists and to write the data to memory can increase the latency of the overall operation.

SUMMARY

In one embodiment, a cache coherent system includes one or more agents (e.g. processor clusters) that may cache data used by the system. The system may include a point of coherency in a memory controller in the system, and thus the agents may transmit read requests to the memory controller to coherently read data. The point of coherency may determine if the data is cached in another agent, and may transmit a copy back request to the other agent if the other agent has modified the data. The system may include an interconnect between the agents and the memory controller. At a point on the interconnect at which traffic from the agents converges, a copy back response may be converted to a fill for the requesting agent. The latency to receive modified data from the previously caching agent may thus be reduced, which may improve performance in the system.

BRIEF DESCRIPTION OF THE DRAWINGS

The following detailed description makes reference to the accompanying drawings, which are now briefly described.

FIG. 8 is a block diagram of one embodiment of a computer accessible storage medium.

Figure 1:
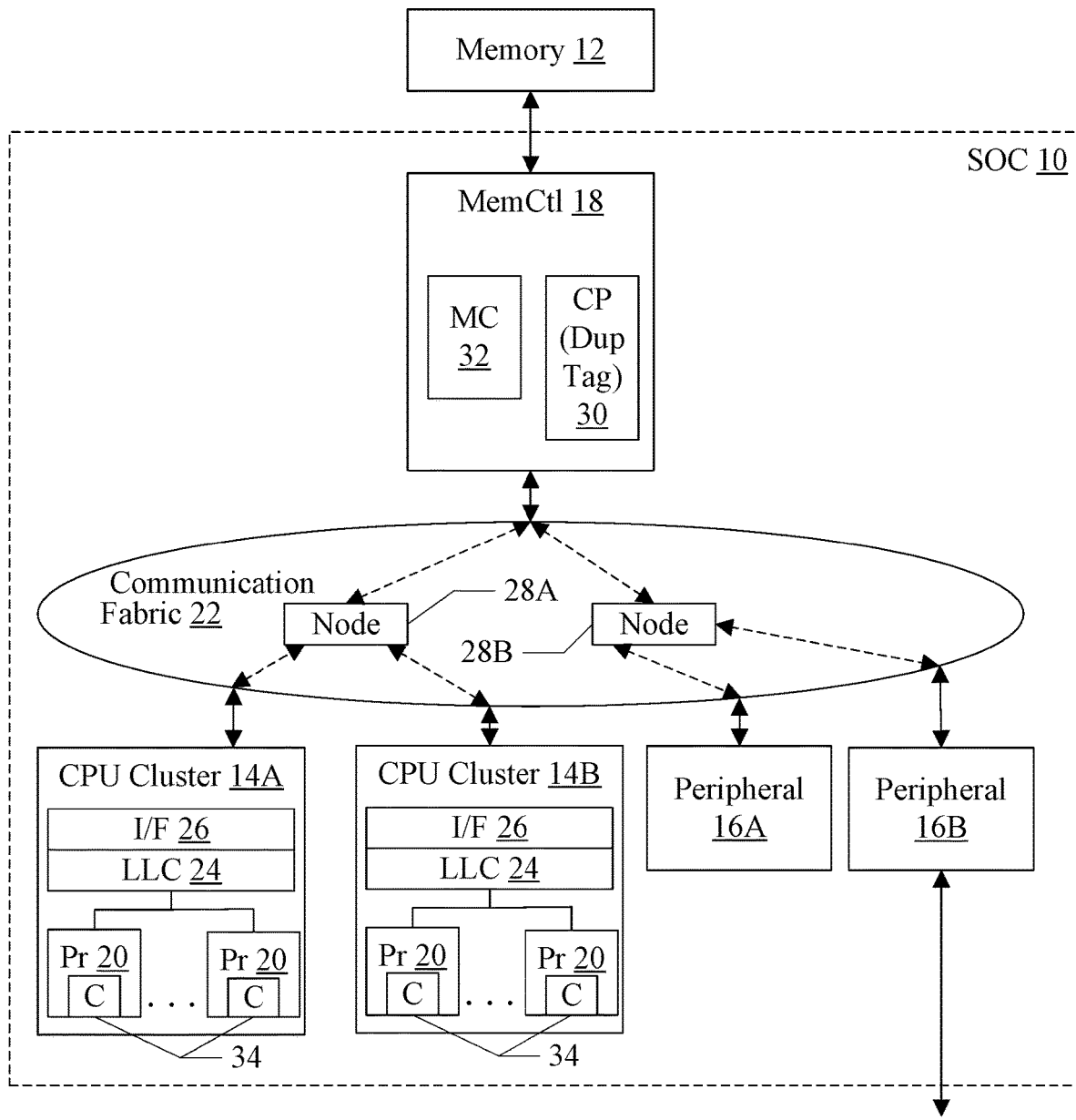
FIG. 1 is a block diagram of one embodiment of a system on a chip.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

FIG. 1 is a block diagram of one embodiment of a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters such as processor clusters 14A-14B. Other embodiments may include more processor clusters than those shown, and/or at least one processor cluster and one or more other coherent agents. The processors in the clusters 14A-14B (Prs 20 in FIG. 1) may be central processing units (CPUs), in an embodiment, and thus the processor clusters 14A-14B may be CPU clusters. In the illustrated embodiment, components of the SOC 10 further include peripheral components 16A-16B (more briefly, "peripherals" 16), a memory controller 18, and a communication fabric 22. The components 14, 16, and 18 may all be coupled to the communication fabric 22, and thus to each other for communication between the components. The memory controller 18 may be coupled to the memory 12 during use.

The CPU clusters 14A-14B generally may include one or more processor cores that act as the CPUs of the SOC 10. The CPUs may generally execute the software that controls overall operation of the system (e.g. operating system software) and various application software that provides the functionality desired in the system. In the embodiment of FIG. 1, the CPU clusters 14A-14B include processor cores 20, which may include one or more local caches per core (reference numeral 34). The CPU clusters 14A-14B may further include, in the illustrated embodiment, one or more shared caches such as the last level cache (LLC) 24. If more than one shared cache is included, the caches may be hierarchical between the local caches 34 and the LLC 24. The LLCs 24 may be coupled to interface circuits (I/F 26), which may be configured to communicate on the interconnect 22 on behalf of the CPU clusters 14A-14B. The LLCs 24 are also coupled to the processor cores 20 in the respective CPU cluster 14A-14B (e.g. via any type of interconnect, such as a bus, point to point links, etc.).

The communication fabric 22 may be any communication interconnect and protocol for communicating among the components of the SOC 10. In the illustrated embodiment, the communication fabric 22 may include a plurality of nodes such as the node 28A and various other nodes such as node 28B. Any configuration of nodes may be supported, and there may be more nodes in the fabric 22 between the clusters 14A-14B and/or the peripherals 16A-16B and or any other agents (not shown in FIG. 1) that may be coupled to the fabric 22. The dotted lines in the fabric 22 indicate the optional presence of additional nodes. The nodes may, in an embodiment, be hierarchical in nature, merging traffic from two or more agents to the memory controller 18 and dividing traffic from the memory controller 18 to the agents. Generally, an agent may be any circuitry that is configured to communicate on the fabric 22 as a unit. Thus, the peripherals 16A-16B may be agents, the CPU clusters 14A-14B may be agents, and there may be other agents such as one or more graphic processing units (GPUs), etc. In some cases, an agent may communicate on behalf of more than one other circuit. For example, peripherals 16A-16B may bridge to two or more other peripherals. The CPU clusters 14A-14B may be agents for the multiple processor cores 20 in the clusters.

A communication may be described as being transmitted toward a destination, in some cases. The communication may be transmitted by an agent or a node in the fabric, and may pass through one or more nodes before arriving at the destination. Thus, the communication is transmitted toward the destination if it moves to the next node on the path to the destination (or if it moves from the last node to the destination).

In an embodiment, the fabric 22 may be packet-based and communications may be packets travelling from a source to a destination. For example, agents may issue read request packets to read data from the memory 12 (through the memory controller 18) and write request packets to write data to the memory 12 (through the memory controller 18). The memory controller 18 may include the point of coherency for the SOC 10 (illustrated as the coherence point, or CP, 30 in FIG. 1). If a coherent agent (e.g. the processor clusters 14A-14B in FIG. 1 and/or some peripherals 16A-16B, in some embodiments) has a modified copy of the data affected by a request, the CP 30 may issue a coherence request packet to the coherent agent over the fabric 22. For example, if the data is modified in the coherent agent, a copy back request may be issued. The coherent agent may respond with a copy back response packet, providing the data. If a coherent agent has an unmodified copy of the data and the request is for an exclusive (e.g. modifiable) copy of the data, the CP 30 may issue an invalidate request packet to the coherent agent, and the coherent agent may acknowledge the request after invalidating the data with an acknowledgement packet. If a coherent agent has an unmodified copy of the data and the request is not for an exclusive copy of the data, the CP 30 may issue a change to shared packet to the coherent agent if the coherent agent has an exclusive copy to ensure that the copy is marked shared and won't be modified by the coherent agent. The coherent agent may acknowledge the request after changing the state with an acknowledgement packet. The memory controller 18 may supply the data to the read requestor with a fill packet. Other embodiments may use other forms of communication. While various transmissions will be referred to in this description (e.g. read requests, copy back requests, copy back responses, etc.), it is understood that each may be transmitted as a packet on a packet-based interconnect such as the fabric 22.

The memory controller 18 may generally include the circuitry for receiving memory operations from the other components of the SOC 10 and for accessing the memory 12 to complete the memory operations. The memory controller 18 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 18 may include queues for memory operations, for ordering (and potentially reordering) the operations and presenting the operations to the memory 12. The memory controller 18 may further include data buffers to store write data awaiting write to memory and read data awaiting return to the source of the memory operation. In some embodiments, the memory controller 18 may include a memory cache 32 to store recently accessed memory data. In SOC implementations, for example, the memory cache 32 may reduce power consumption in the SOC by avoiding reaccess of data from the memory 12 if it is expected to be accessed again soon. In some cases, the memory cache 32 may also be referred to as a system cache, as opposed to private caches such as the shared cache 24 or caches 34 in the processors 20, which serve only certain components. Additionally, in some embodiments, a system cache need not be located within the memory controller 18.

As mentioned previously, the memory controller 18 may further include the coherence point 30. The coherence point 30 may include, for example, one or more sets of duplicate tags corresponding to the tags in the LLCs 24. The LLCs 24 may be inclusive of the data in the caches 34, and thus a copy of the cache tags (identifying cache blocks stored in the LLCs 24) may be sufficient for determining if a copy of the data requested by a given read request or being written by a given write request is stored in a processor cluster 14A-14B (and thus determining if a coherence action such as a copy back request or an invalidate request is to be issued to maintain cache coherency). The CP 30 may update the duplicate tags as data is provided to the processor clusters 14A-14B to be cached, and may update the duplicate tags when the clusters 14A-14B evict cache blocks to store other blocks or in response to coherence requests from the CP 30 as well.

The interface circuits 26 may receive coherence requests from the communication fabric 22, and may pass the requests to the LLC 24. The LLC 24 may communicate with the processors 20 as needed to process the coherence requests (e.g. retrieving modified data from the caches 34 in the processors 20, invalidating data, changing state, etc.) and may generate the responses/acknowledgements for the interface circuits 26 to issue on the fabric 22. Similarly, when fills are received from the fabric 22, the interface circuits 26 may pass the fills to the LLC 24. The LLC 24 may update with the fill data, and may pass the fill data to one or more of the caches 34 as well (e.g. the cache 34 in the processor 20 that generated the read request).

The peripherals 16A-16B may be any set of additional hardware functionality included in the SOC 10. For example, the peripherals 16A-16B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 16B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

It is noted that the number of components of the SOC 10 may vary from embodiment to embodiment. There may be more or fewer of each component than the number shown in FIG. 1. It is further noted that processor clusters will be used as examples of coherent agents below. However, any combination of coherent agents may be used. For example, individual processors may be coherent agents. Non-CPU processors (e.g. GPUs, microcontrollers, image signal processors, etc.) may be coherent agents, if desired, and there may be processor clusters of the non-CPU processors in some embodiments. Non-processor hardware (e.g. peripherals of various sorts) that cache data may be coherent agents.

Figure 2:
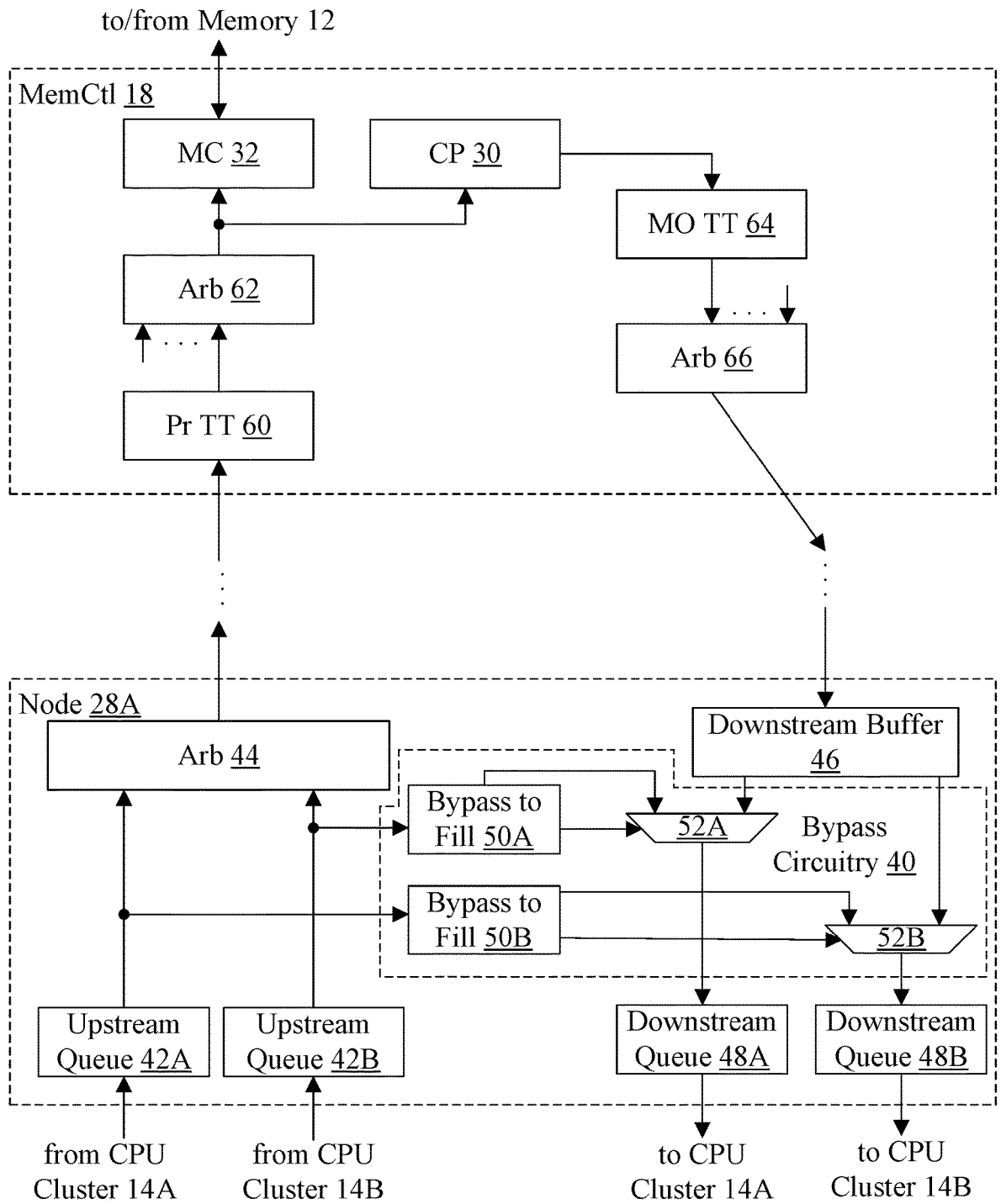
FIG. 2 is a block diagram of one embodiment of several components shown in FIG. 1 in greater detail.

FIG. 2 is a block diagram illustrating one embodiment of the node 28A and the memory controller 18 in more detail. Other nodes such as node 28B may be similar to the node 28A, with the exception of the bypass circuitry 40. In the illustrated embodiment, the node 28A includes a plurality of upstream queues 42A-42B, an arbiter circuit 44, the bypass circuitry 40, a downstream buffer 46, and a plurality of downstream queues 48A-48B. The queues 42A and 48A are coupled to the processor cluster 14A (directly or indirectly through one or more other nodes). The queues 42B and 48B are coupled to the processor cluster 14B (directly or indirectly through one or more other nodes). The upstream queues 42A-42B are coupled to the arbiter circuit 44 and the bypass circuitry 40. The arbiter circuit 44 is configured to output packets upstream toward the memory controller 18, and may be coupled directly or indirectly to the memory controller 18. The downstream buffer 46 may be configured to receive packets directly or indirectly from the memory controller 18, and is coupled to the bypass circuitry 40. The bypass circuitry 40 is further coupled to the downstream queues 48A-48B.

In the illustrated embodiment, the bypass circuitry 40 includes a plurality of bypass to fill circuits 50A-50B and a plurality of multiplexors (muxes) 52A-52B. The bypass to fill circuit 50A is coupled to the upstream queue 42B and the mux 52A, which is coupled to the downstream queue 48A and the downstream buffer 46. The bypass to fill circuit 50B is coupled to the upstream queue 42A and to the mux 52B, which is coupled to the downstream queue 48B and the downstream buffer 46. More particularly, the bypass to fill circuits 50A-50B are coupled to an input of the respective muxes 52A-52B and to the selection control of the respective muxes 52A-52B. The downstream buffer 46 is coupled to the other input of the muxes 52A-52B. The output of the mux 52A is coupled to the downstream queue 48A and the output of the mux 52B is coupled to the downstream queue 48B.

As mentioned above, the node 28A may be configured to merge traffic from the processor clusters 14A-14B traveling to the memory controller 18 (e.g. various communications such as read and write requests, copy back responses, acknowledgements, etc.). The node 28A may also be configured to divide traffic from the memory controller 18 traveling to the respective processor clusters 14A-14B (e.g. various communications such as copy back requests, invalidate requests, completions, fills, etc.) based on the destination of the traffic. That is, traffic may be targeted to one of the processor clusters 14A-14B by the memory controller 18 (e.g. using an identifier (ID) assigned to the cluster 14A-14B, a tag that identifies the transaction that caused the communication, etc.). The node 28A may transmit the communication to the targeted processor cluster 14A-14B.

More particularly, packets may arrive at the node 28A from the clusters 14A-14B and may enqueue in (e.g. be written to) the corresponding upstream queue 42A-42B. The arbiter circuit 44 may be configured to arbitrate between the upstream queues 42A-42B to select packets to transmit toward the memory controller 18. The arbiter circuit 44 may include a variety of factors in the arbitration, including an indication of which upstream queue 42A-42B has most recently won arbitration (e.g. most recent winner, a history of most recent wins, a credit mechanism to track winning arbitrations, etc.). Age of the packets in the queues 42A-42B may affect arbitration. Different types of packets may travel in different virtual channels, and availability of credits assigned to the various virtual channels may affect arbitration. A static or dynamic priority scheme among the packet types may affect arbitration. Any combination of one or more factors may be used to control arbitration. The arbitration circuit 44 may read the selected packet from the corresponding upstream queue 42A-42B, transmit the selected back on the fabric 22 toward the memory controller 18, and dequeue the packet from the corresponding upstream queue 42A-42B (e.g. delete the packet from the corresponding upstream queue 42A-42B).

The bypass circuitry 40 may examine the packets in the upstream queues 42A-42B, searching for packets that are copy back responses that may be converted to fills. For example, the bypass to fill circuit 50A may examine packets in the upstream queue 42B for copy back responses from the processor cluster 14B that may be converted to fills for the processor cluster 14A. The copy back requests from the memory controller 18 may be tagged to indicate which requests were generated by read requests from the other processor cluster 14A-14B (as compared to requests from another agent such as a non-caching peripheral 16A-16B). If a convertible copy back response is detected, the bypass to fill circuit 50A may generate the fill with the data from the copy back response. Thus, a copy back response may be converted to a fill by generating the fill using information from the copy back response and the data corresponding to the copy back response. In one embodiment, the copy back response may also be transmitted to the memory controller 18 to update the memory 12 (and/or the memory cache 32). However, the copy back response may be tagged as converted to a fill by the bypass circuitry 40, so that the fill is not provided again by the memory controller 18. The bypass to fill circuit 50A may provide the fill as an input to the mux 52A, and may control the mux 52A via the selection control to enqueue (write) the fill in the downstream queue 48A. The fill may subsequently be transmitted toward the CPU cluster 14A. Similarly, the bypass to fill circuit 50B may examine the packets in the upstream queue 42A, searching for copy back responses from the cluster 14A that may be converted to fills to the cluster 14B and may generate those fills and control the mux 52B to enqueue the fills in the downstream queue 48B to be transmitted toward the cluster 14B.

The downstream buffer 46 may be provided to capture packets from the fabric 22 that are travelling toward the CPU clusters 14A-14B, in the case that these packets are delayed by bypassing fill packets. During times that the bypass to fill circuits 50A-50B are not bypassing fill packets, the circuits 50A-50B may be configured to control the muxes 52A-52B to select the output of the downstream buffer 46, enqueuing the received packets in the downstream queues 48A-48B based on which processor clusters 14A-14B are the destination of the packets.

Packets arriving from the node 28A (over the fabric 22, possibly through one or more intervening nodes) may be captured in the memory controller 18. A processor transaction table (Pr TT) 60 may record various information regarding the received packets, to track the progress of the packets through the memory controller 18. An arbiter circuit 62 is coupled to the processor transaction table 60 and other transaction tables corresponding to other agents on the fabric 22, and may arbitrate among the tables to source transactions into the memory cache 32 and/or the coherence point 30. A variety of factors may affect the arbitration, including priority, age, credits available for different virtual channels, availability of resources used by the transactions in the memory cache 32, the coherence point 30, and/or other portions of the memory controller 18 pipeline, etc. Once a processor request/response wins arbitration, the request/response may be processed by the memory cache 32 to determine if it is a hit in the memory cache 32, determine if it is to be allocated in the memory cache 32, and determine if it is to be passed on the memory pipeline to update the memory 12.

The coherence point 30 may process the transactions for coherence purposes, including checking the duplicate tags for copies of the data read by a read request or written by a write request. If a copy is detected, the coherence point 30 may be configured to generate an invalidate request (if an exclusive copy is requested by the transaction) or a change state request (if a non-exclusive copy is requested by the transaction and a non-modified copy is detected). The coherence point 30 may be configured to generate a copy back request if the data is modified. The coherence request may be written to a memory output transaction table (MO TT) 64 to be transmitted to the coherent agent that has the copy (e.g. one of the processor clusters 14A-14B). An arbiter circuit 66 may arbitrate among the packets in the MO TT 64 and other sources in the memory controller 18, using various factors similar to the discussion above of the arbitration circuit 62. If the coherence request is the winner of the arbitration, the memory controller 18 may issue the coherence request on the fabric 22 toward the processor cluster 14A-14B.

The processor clusters 14A-14B and/or other coherent agents in other embodiments may respond to copy back requests with copy back responses providing the data, and may respond to invalidate/change state requests with acknowledgements indicating that the invalidate/change state has been processed. The memory controller 18 may be configured to generate a fill for a read transaction responsive to receiving the response/acknowledgement. In the case of the copy back response, the fill may include the data from the copy back response. In the case of the acknowledgement, the fill may include data from the memory cache 32 or the memory 12, depending on whether or not the data is a hit or miss in the memory cache 32. In the case of the acknowledgement, generation of the fill may also wait for data availability.

Processing of the response/acknowledgement may be similar to processing the read/write request: write to the Pr TT 60 arbitration by the arb circuit 62, transmission to the CP 30 (and the memory cache 32 for update in the cache or the memory 12, for a copy back response), generation of the fill to the MO TT 64, arbitration by the arbiter circuit 66, and issue to the fabric 22. In the case of the copy back response, if the response was indicated as having been bypassed as a fill at the node 28A, the fill may be suppressed by the memory controller 18. However, the data from the copy back response may still be written to the memory cache 32 or memory 12, and the CP 30 may update to indicate that the copy back response is complete.

While there are two processor clusters 14A-14B in the illustrated embodiment, there may be more than two processor clusters. When there are more than two processor clusters, copy back requests and responses may be tagged with an indication of which processor cluster 14A-14B sourced the read request that triggered the copy back request. The bypass circuitry may use the indication to generate a fill for the identifying processor cluster 14A-14B in such embodiments. Additional muxes similar to the muxes 52A-52B may be used to bypass the generated fills to the corresponding downstream queues 48A-48B.

Figure 3:
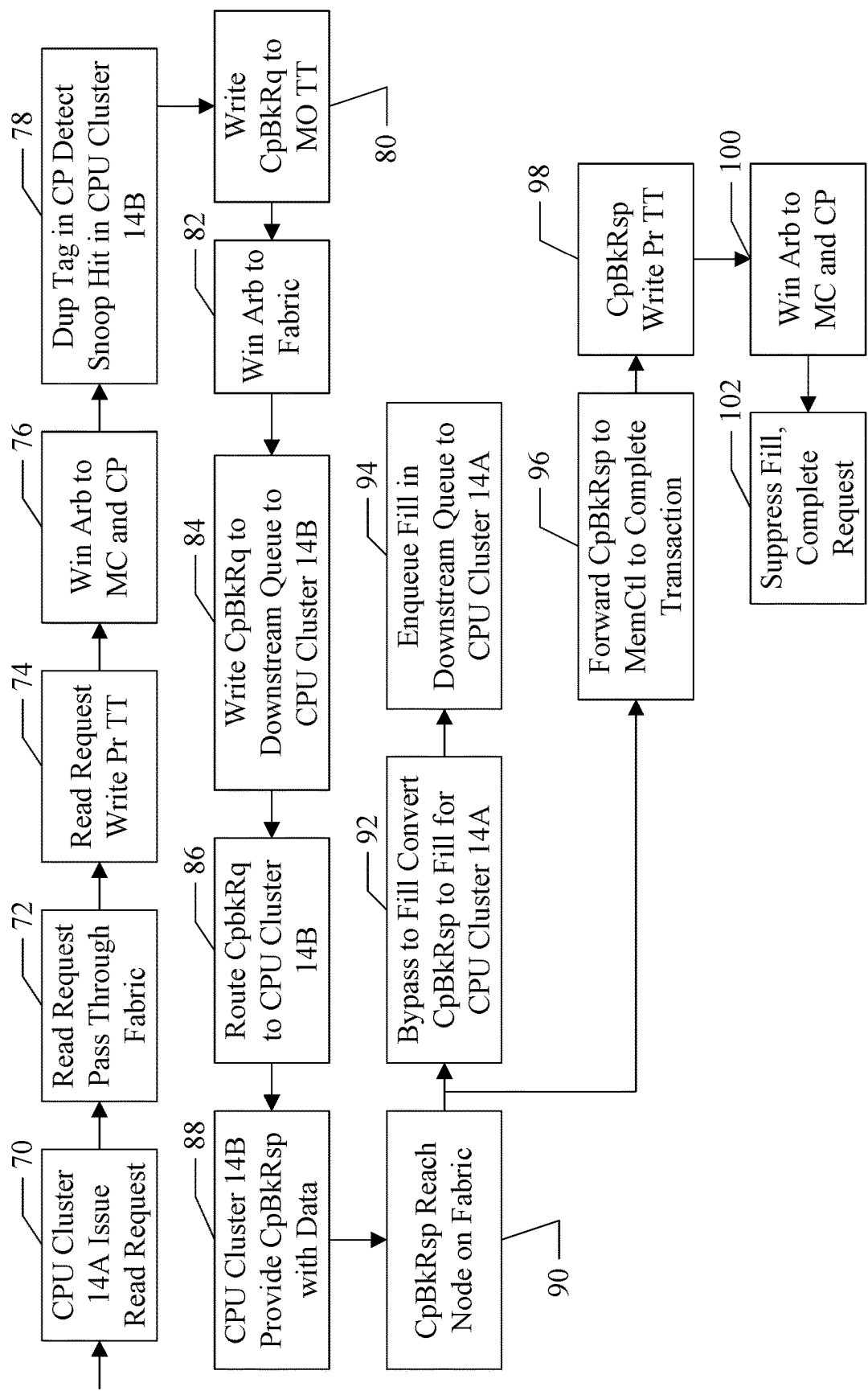
FIG. 3 is a flow diagram illustrating various activities in one embodiment of the system illustrated in FIGS. 1 and 2 to coherently transfer data from one caching agent to another.

FIG. 3 is a block diagram of an example flow of packets and various other operations for one embodiment of a read request from the processor cluster 14A for a cache block of data that is cached by the processor cluster 14B. The data is modified in the cluster 14B. That is, the data stored in the memory 12 or the memory cache 32 is the data prior to one or more stores (writes) performed in the cluster 14B. In other embodiments, a similar mechanism to bypass data from one processor cluster to another processor cluster when the data is not modified by the sourcing processor cluster may be employed. Each block illustrated in FIG. 3 may represent at least one clock cycle, and some blocks may represent multiple clock cycles in a pipeline to perform the operation.

The example flow begins with the processor cluster 14A issuing a read request on the fabric 22 (block 70). The read request passes through the fabric 22 over one or more clock cycles (block 72), arriving at the memory controller 18. The read request is written to the Pr TT 60 (block 74), and the arbitration circuit 62 begins arbitrating the read requests with other requests in the Pr TT 60 and other request sources in the memory controller 18 (e.g. other transaction tables). The read request wins arbitration to the memory cache 32 and the coherence point 30 (block 76).

In the pipeline of the coherence point 30, the duplicate cache tags for the processor cluster 14B detects a snoop hit for the data accessed by the read request, and the data is either modified or may be modified (e.g. the cache block may have been provided in the exclusive state, which would permit the receiving processor cluster to modify the data without further communication on the fabric 22) (block 78). Accordingly, the coherence point 30 generates a copy back request (CpBkRq) for the processor cluster 14B to retrieve the modified data, and writes the copy back request to the MO TT 64 (block 80). The arbiter circuit 66 begins arbitrating the copy back request with other requests in the MO TT 64 and other sources within the memory controller 18 (e.g. other transaction tables). The copy back request wins arbitration to the fabric 22 (block 82) and travels over the fabric 22 to the node 28A. The node 28A writes the copy back request to the downstream queue 48B (block 84), and the copy back request is routed over the remainder of the fabric 22 to the processor cluster 14B (block 86).

The processor cluster 14B processes the copy back request, obtaining the modified data and generating a copy back response (CpBkRsp) with the data (block 88). The processor cluster 14B issues the copy back response on the fabric 22, and the response reaches the node 28A (block 90), writing the upstream queue 42B. The bypass circuitry 40 (and more particularly the bypass to fill circuit 50A) detects the copy back response and generates the fill for the processor cluster 14A with the data from the copy back response (block 92). The bypass circuitry 40/bypass to fill circuit 50A enqueues the fill in the downstream queue 48A to the processor cluster 14A, which subsequently receives the fill and may begin processing the data (block 94).

In parallel with bypassing the copy back response as a fill to the processor cluster 14A, the node 28A forwards the copy back response to the memory controller 18 to complete the read transaction (block 96). That is, the copy back response wins arbitration by the arbitration circuit 44 and proceeds to the memory controller 18. The copy back response arrives in the memory controller 18 from the fabric 22, and writes the Pr TT 60 (block 98). The copy back response wins arbitration in the arbitration circuit 62, and is provided to the memory cache 32 and the coherence point 30 (block 100). The coherence point 30 suppresses the fill generation based on the previous bypassing of the data, and completes the request by updating the duplicate tags to reflect the current state of the cache block in various coherent agents (block 102) and completes the request. The data may also be allocated in the memory cache 32 and/or may be forwarded to the memory 12 for update, in some embodiments.

Figure 4:
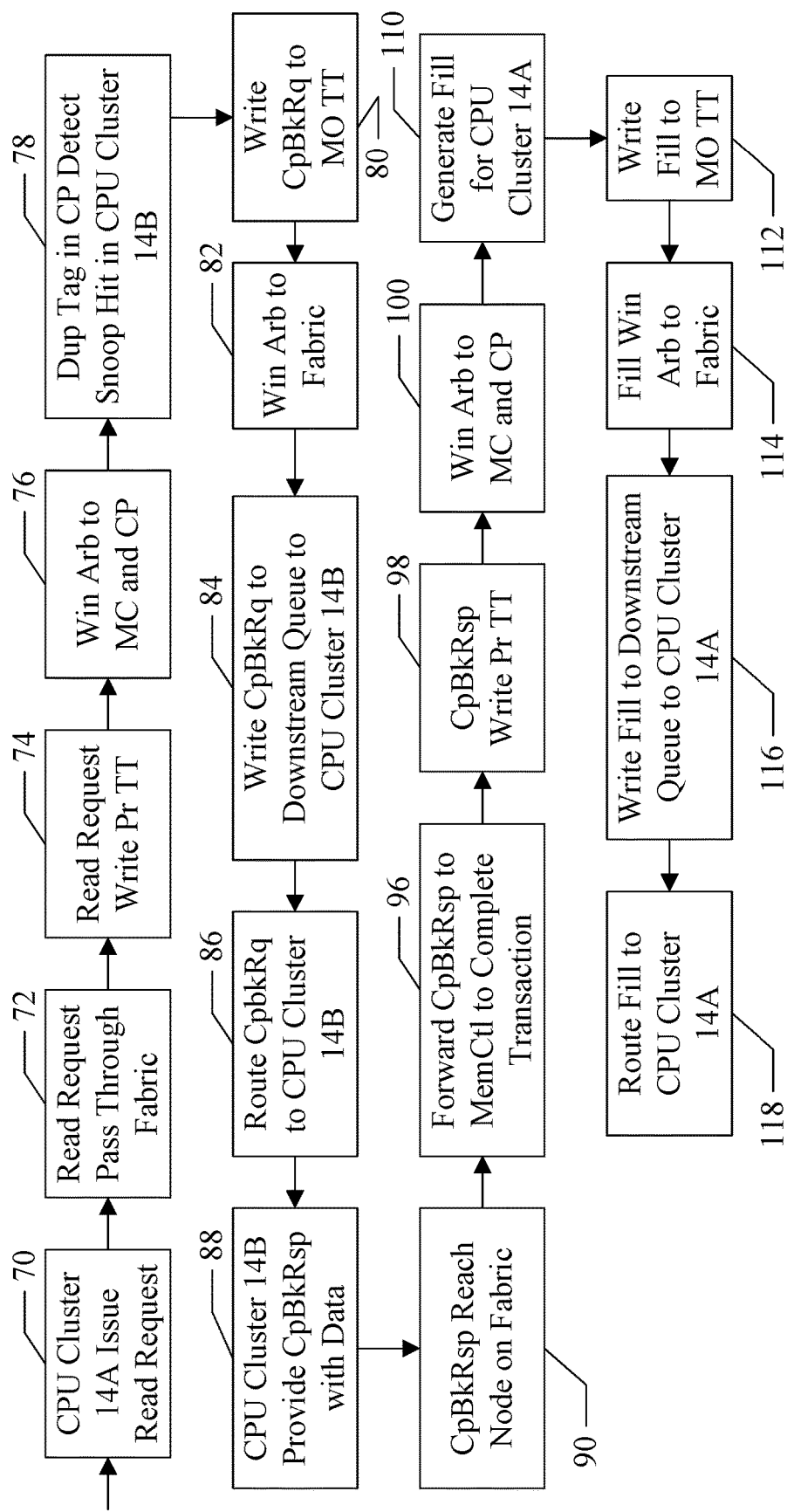
FIG. 4 is a flow diagram illustrating various activities in another embodiment to coherently transfer data.

For comparison, FIG. 4 is a block diagram of an example flow of packets and various other operations for one embodiment of a read request from the processor cluster 14A for a cache block of data that is cached by the processor cluster 14B, if the bypass to fill does not occur or is not implemented. Blocks 70, 72, 74, 76, 78, 80, 82, 84, 86, 88, and 90 are similar to the above discussion from FIG. 3, and the copy back response arrives at the node 28A on the fabric 22. However, in this case, the bypassing is not performed. The copy back response is forwarded on the fabric 22 to the memory controller 18 (block 96) and writes the Pr TT 60 (block 98). The copy back response wins arbitration in the arbitration circuit 62, and is provided to the memory cache 32 and the coherence point 30 (block 100). The coherence point 30 generates the fill for the processor cluster 14A (block 110) and writes the fill to the MO TT 64 (block 112). The arbitration circuit 66 arbitrates the fill with other requests, and the fill subsequently wins arbitration to the fabric 22 (block 114). The fill progresses through the fabric 22 to the node 28A, in which the fill enqueues in the downstream queue 48A for the processor cluster 14A (block 116). The fill is subsequently routed to the processor cluster 14A (block 118). Accordingly, the latency avoided using the bypass to fill mechanism may generally include the time represented by blocks 96, 98, 100, 110, 112, 114, 116, and 118 (less the time to propagate the bypassed fill from the node 28A to the processor cluster 14A).

Figure 5:
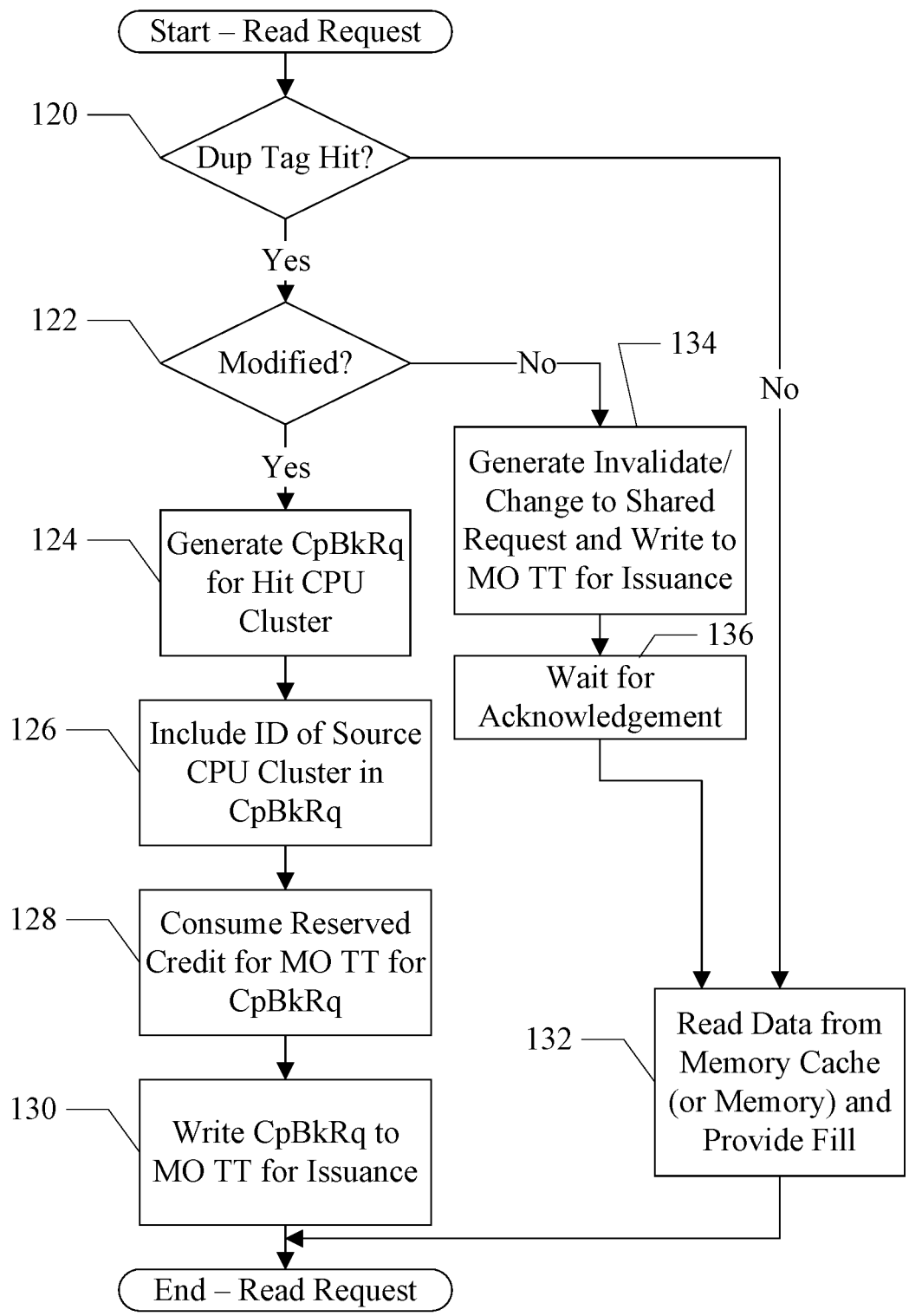
FIG. 5 is a flowchart illustrating operation of one embodiment of a memory controller illustrated in FIGS. 1 and 2 in response to a ready request.

FIG. 5 is a flowchart illustrating operation of one embodiment of the memory controller 18 to process a read request. While the blocks are shown in a particular order for ease of understanding, other orders may be used. Blocks may be performed in parallel in combinatorial logic in the memory controller 18. Blocks, combinations of blocks, and/or the flowchart as a whole may be pipelined over multiple clock cycles. The memory controller 18 (and various components thereof, e.g. as illustrated in FIGS. 1 and 2) may be configured to implement the operation shown in FIG. 5.

The memory controller 18 (and more particularly the coherence point 30) may be configured to access the duplicate tags for the read request. If the request is a hit in the duplicate tags (decision block 120, "yes" leg) and the data is modified or may be modified in a caching coherent agent (e.g. another processor cluster) (decision block 122, "yes" leg), the coherence point 30 may be configured to generate a copy back request for the processor cluster that is a hit in the duplicate tags (block 124). That is, the processor cluster that is hit is the cluster that is caching the modified data. The coherence point 30 may be configured to include one or more identifiers (ID) of the source cluster 14A-14B that generated the read request, so that the node 28A may be able to generate the fill for the source cluster from the copy back response (block 126). In one embodiment, access to the various transaction tables in the memory controller 18 may be controlled by credits. For most transactions, a credit may be requested at the time a credit is needed. However, for further latency reduction, an embodiment of the memory controller 18 may be configured to reserve one or more credits for the MO TT 64 for use by copy back requests that are going to generate bypass fills. In such an embodiment, the coherence point 30 may be configured to consume the reserved credit, eliminating the request and response delay for the credit (block 128). The coherence point 30 may be configured to write the copy back request to the MO TT 64 for issuance on the fabric 22 (block 130).

If the request is a hit in the duplicate tags (decision block 120, "yes" leg), but the data is not modified in the caching coherent agent (or agents, since multiple agents may cache an unmodified block) (decision block 122, "no" leg), the memory controller 18 (and more particularly the coherence point 30) may be configured to generate the invalidate/change to shared request and to write the request to the MO TT 64 (block 134). The memory controller 18 may wait for the corresponding acknowledgement (block 136) before proceeding with the fill. When the acknowledgement has been received, the memory controller 18 (and more particularly the memory cache 32) may be configured to read the data from the memory cache 32 (if the data is a hit in the memory cache 32) or from the memory 12 and may be configured provide the fill to be transmitted on the fabric 22 to the requesting agent (block 132). If the request is a miss in the duplicate tags (decision block 120, "no" leg), the memory controller 18 may be configured to read the data from the memory cache 32/memory 12 and provide the data (block 132).

Figure 6:
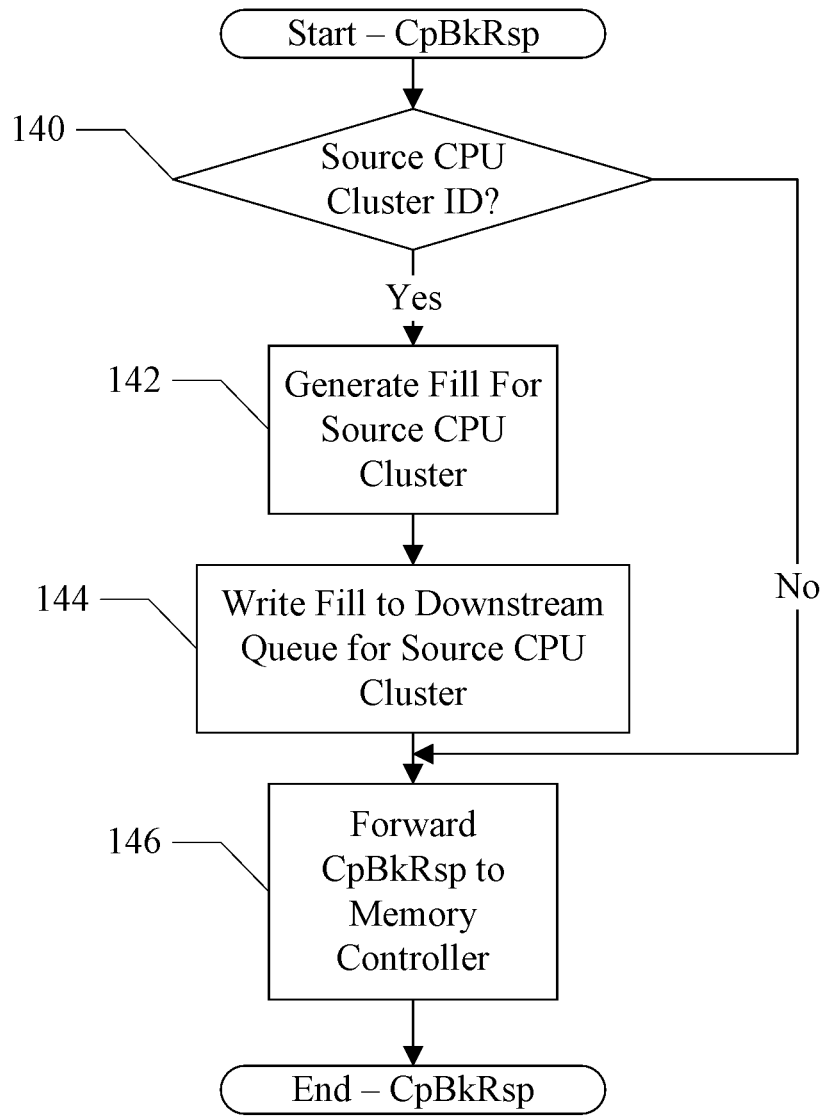
FIG. 6 is a flowchart illustrating operation of one embodiment of a node in an interconnect between coherent agents and a memory controller.

FIG. 6 is a flowchart illustrating operation of one embodiment of the node 28A to process a copy back response from a processor cluster 14A-14B. While the blocks are shown in a particular order for ease of understanding, other orders may be used. Blocks may be performed in parallel in combinatorial logic in the node 28A. Blocks, combinations of blocks, and/or the flowchart as a whole may be pipelined over multiple clock cycles. The node 28A (and various components thereof, e.g. as illustrated in FIGS. 1 and 2) may be configured to implement the operation shown in FIG. 6.

The node 28A may be configured to check the copy back response to determine if the response includes a source processor cluster ID for the processor cluster that sourced the read request that triggered the copy back request (decision block 140). In one embodiment, the processor cluster 14A-14B that receives a copy back request may be configured to copy fields of the copy back request packet that include the source processor cluster ID (inserted by the coherence point 30 when generating the copy back request packet) to corresponding fields of the copy back response packet. A valid bit or bits, or other indications, may indicate the validity of the fields. Other copy back requests/responses may not include the source processor cluster ID (e.g. if a non-caching agent has generated the request or an agent that does not merge traffic with the caching agent has requested the data, and thus a bypass may not be performed). If the copy back response does include the source processor cluster ID (decision block 140, "yes" leg), the node 28A (and more particularly the bypass circuitry 40) may be configured to generate the fill for the source processor cluster (block 142) and may be configured to write the generated fill to the downstream queue 48A-48B for the source processor cluster 14A-14B (block 144). Additionally, the node 28A may be configured to forward to the copy back response to the memory controller 18 (block 146). In this case, the node 28A may modify the copy back response to indicate that the fill was generated and bypassed, so the memory controller 18 may suppress the fill. On the other hand, if the copy back response does not include the source processor cluster ID (decision block 140, "no" leg), the node 28A may not generate the fill (blocks 142 and 144) but may still forward the copy back response to the memory controller 18 (block 146). In this cache, the node 28A may not modify the copy back response, and thus the memory controller 18 may subsequently issue a fill.

Figure 7:
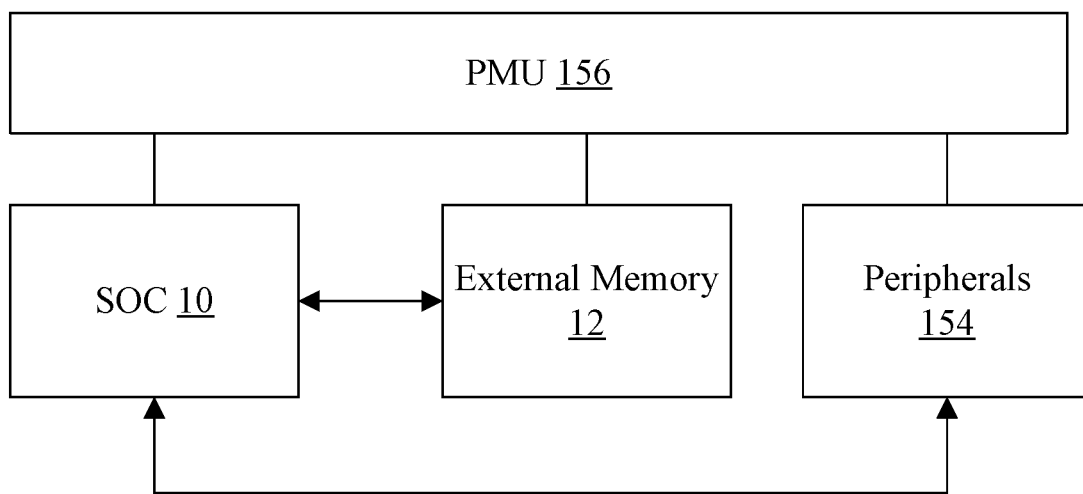
FIG. 7 is a block diagram of one embodiment of a system including the system on a chip shown in FIG. 1.

FIG. 7 is a block diagram of one embodiment of a system 150. In the illustrated embodiment, the system 150 includes at least one instance of the SOC 10 coupled to one or more peripherals 154, and the external memory 12. The PMU 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The PMU 156 may generally include the circuitry to generate supply voltages and to provide those supply voltages to other components of the system such as the SOC 10, the memory 12, various off-chip peripheral components 154 such as display devices, image sensors, user interface devices, etc. The PMU 156 may thus include programmable voltage regulators, logic to interface to the SOC 10 to receive voltage requests, etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Turning now to FIG. 8, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 8 may store a database 204 representative of the SOC 10. Generally, the database 204 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 204 on the computer accessible storage medium 200 may be the netlist (with or without the synthesis library) or the data set, as desired.

While the computer accessible storage medium 200 stores a representation of the SOC 10, other embodiments may carry a representation of any portion of the SOC 10, as desired, including any subset of the processor clusters 14A-14B or portions thereof, the memory controller 18 or portions thereof, the communication fabric 22, other components and/or peripherals, etc. The database 204 may represent any portion of the above.

In accordance with the above description, one embodiment of a system comprises a plurality of coherent agents, wherein the plurality of coherent agents are cache coherent; a memory controller, wherein a point of coherency for the plurality of coherent agents is in the memory controller; and an interconnect, The memory controller and the plurality of coherent agents are included in a plurality of agents coupled to the interconnect. The interconnect includes a plurality of nodes interconnecting the plurality of agents. A first node of the plurality of nodes is a point at which requests from the plurality of coherent agents are merged traveling toward the memory controller. The memory controller is configured to detect that a first coherent agent of the plurality of coherent agents has a modified copy of data that is targeted by a read request from a second coherent agent of the plurality of coherent agents responsive to receiving the read request from the interconnect. The memory controller is configured to issue a copy back request over the interconnect to the first coherent agent responsive to detecting the modified copy. The first coherent agent is configured to issue a copy back response to the copy back request over the interconnect, including the modified copy of the data. The first node is configured to convert the copy back response to a fill to the second coherent agent and to transmit the fill to the second coherent agent. The first node is also configured to transmit the copy back response to the memory controller. In an embodiment, the memory controller may be configured to suppress a second fill to the second coherent agent from the memory controller in response to the fill being sent from the first node to the second coherent agent. In an embodiment, the first node may comprise a first plurality of queues and an arbitration circuit coupled to the first plurality of queues. Respective queues of the first plurality of queues may be coupled to respective coherent agents of the plurality of coherent agents. The first node may be configured to enqueue communications from the respective coherent agents in the respective queues. The arbitration circuit may be configured to arbitrate between the first plurality of queues to select communications to be transmitted on the interconnect toward the memory controller, thereby merging communications from the plurality of coherent agents. In an embodiment, the first node may further comprise a second plurality of queues and a plurality of bypass circuits coupled to the first plurality of queues. Respective queues of the second plurality of queues may be coupled to respective coherent agents of the plurality of coherent agents, and the first node may be configured to enqueue communications to the respective coherent agents in the respective queues of the second plurality of queues. The plurality of bypass circuits may be configured to convert the copy back response from a first queue of the first plurality of queues corresponding to the first coherent agent to a fill for a second queue of the second plurality of queues corresponding to the second coherent agent. In an embodiment, the first node may further comprise a buffer configured to receive communications from the memory controller to the plurality of coherent agents and a plurality of multiplexors coupled to the buffer and to respective bypass circuits of the plurality of bypass circuits. The plurality of bypass circuits may be configured to control the plurality of multiplexors to select fills converted from copy back responses through the plurality of multiplexors to enqueue the fills in the second plurality of queues. In an embodiment, the plurality of bypass circuits may be configured to control the plurality of multiplexors to select communications from the buffer when the fills are not present. In an embodiment, a given coherent agent of the plurality of coherent agents comprises a plurality of processors having caches and a shared cache coupled to the plurality of processors. The shared cache may be configured to respond to copy back requests received from the interconnect. In an embodiment, the shared cache may be configured to receive fills from the interconnect and write the received data to the shared cache, and to forward the data to a requesting processor of the plurality of processors. In an embodiment, the plurality of agents may further comprise one or more peripherals.

In an embodiment, an interconnect comprises a plurality of nodes to connect a plurality of agents including a memory controller and a plurality of coherent agents. A first node of the plurality of nodes is a point in the interconnect at which packets from the plurality of coherent agents to the memory controller are merged. The first node comprises a first plurality of queues, a second plurality of queues, and bypass circuitry coupled between the first plurality of queues and the second plurality of queues. The first node is configured to write packets received from a given coherent agent of the plurality of coherent agents to a given first queue of the first plurality of queues. The first node is also configured to write packets to be transmitted to the given coherent agent to a given second queue of the second plurality of queues. The bypass circuitry is configured to detect a copy back response packet from a first coherent agent of the plurality of coherent agents that corresponds to a previous read request from a second coherent agent of the plurality of coherent agents. The bypass circuitry is further configured to generate a fill packet for the second coherent agent including data from the copy back response packet. The bypass circuitry is further configured to write the fill packet to one of the second plurality of queues to transmit to the second coherent agent. In an embodiment, first node may further comprise an arbitration circuit coupled to the first plurality of queues. The arbitration circuit may be configured to arbitrate among the packets in the first plurality of queues to select a packet for transmission to the memory controller, thereby merging the packets from the plurality of coherent agents. In an embodiment, the arbitration circuit may be further configured to select the copy back response packet for transmission to the memory controller, in addition to transmission of the fill packet to the second coherent agent. In an embodiment, the interconnect may be further configured to receive packets from the memory controller to be transmitted to the plurality of coherent agents. The bypass circuitry may comprise a plurality of multiplexors, and the bypass circuitry may be configured to control the plurality of multiplexors to select fill packets generated from copy back response packets through the plurality of multiplexors to the second plurality of queues. In an embodiment, the bypass circuitry may be configured to control the plurality of multiplexors to select packets from other nodes in the interconnect to the plurality of coherent agents when the fill packets are not present.

In an embodiment a method is disclosed for a system comprising a plurality of processor clusters, a memory controller, and an interconnect coupled to the plurality of processor clusters and the memory controller. The interconnect includes at least a first node at which communications from the plurality of processor clusters are merged to travel to the memory controller. The method comprises issuing a copy back request from the memory controller to a first processor cluster of the plurality of processor clusters responsive to detecting that the first processor cluster includes a modified copy of data requested by a read request from a second processor cluster of the plurality of processor clusters. The method further comprises issuing a copy back response to the copy back request by the first processor cluster, including the copy of the data. The method still further comprises converting the copy back response to a fill to the second processor cluster in the first node and transmitting the fill to the second processor cluster. In an embodiment, the method may comprise transmitting the copy back response from the first node to the memory controller in addition to converting the copy back response to the fill. In an embodiment, the method may further comprise suppressing a second fill to the second processor cluster from the memory controller in response to receiving the copy back response from the first node. In an embodiment, the method may further comprise issuing the read request from the second processor cluster, wherein detecting that the first processor cluster has the modified copy is responsive to the read request. In an embodiment, the method may further comprise arbitrating among communications from the plurality of processor clusters in the first node to select communications to forward on the interconnect to the memory controller, thereby merging the communications. In an embodiment, the method may further comprise bypassing the fill by the first node to the second processor cluster and buffering, by the first node, another communication from the memory controller to the second processor cluster during the bypassing.

Numerous variations and modifications will become apparent to those skilled in the art once the above disclosure is fully appreciated. It is intended that the following claims be interpreted to embrace all such variations and modifications.

What is claimed is:

1. A system comprising:
   a plurality of coherent agents, wherein the plurality of coherent agents are cache coherent;
   a memory controller, wherein a point of coherency for the plurality of coherent agents is in the memory controller; and
   an interconnect, wherein the memory controller and the plurality of coherent agents are included in a plurality of agents coupled to the interconnect, and wherein the interconnect includes a plurality of nodes interconnecting the plurality of agents, and wherein a first node of the plurality of nodes is a point at which requests from the plurality of coherent agents are merged traveling toward the memory controller, and wherein:
      the memory controller is configured to detect that a first coherent agent of the plurality of coherent agents has a modified copy of data that is targeted by a read request from a second coherent agent of the plurality of coherent agents responsive to receiving the read request from the interconnect;
      the memory controller is configured to issue a copy back request over the interconnect to the first coherent agent responsive to detecting the modified copy;
      the first coherent agent is configured to issue a copy back response to the copy back request over the interconnect, including the modified copy of the data; and
      the first node is configured to convert the copy back response to a fill to the second coherent agent and to transmit the fill to the second coherent agent.

2. The system as recited in claim 1 wherein the first node is also configured to transmit the copy back response to the memory controller.

3. The system as recited in claim 2 wherein the memory controller is configured to suppress a second fill to the second coherent agent from the memory controller in response to the fill being sent from the first node to the second coherent agent.

4. The system as recited in claim 1 wherein the first node comprises:
   a first plurality of queues, wherein respective queues of the first plurality of queues are coupled to respective coherent agents of the plurality of coherent agents, and wherein the first node is configured to enqueue communications from the respective coherent agents in the respective queues; and
   an arbitration circuit coupled to the first plurality of queues and configured to arbitrate between the first plurality of queues to select communications to be transmitted on the interconnect toward the memory controller, thereby merging communications from the plurality of coherent agents.

5. The system as recited in claim 4 wherein the first node further comprises:
   a second plurality of queues, wherein respective queues of the second plurality of queues are coupled to respective coherent agents of the plurality of coherent agents, and wherein the first node is configured to enqueue communications to the respective coherent agents in the respective queues of the second plurality of queues; and
   a plurality of bypass circuits coupled to the first plurality of queues and configured to convert the copy back response from a first queue of the first plurality of queues corresponding to the first coherent agent to the fill for a second queue of the second plurality of queues corresponding to the second coherent agent.

6. The system as recited in claim 5 wherein the first node further comprises:
   a buffer configured to receive communications from the memory controller to the plurality of coherent agents; and
   a plurality of multiplexors coupled to the buffer and to respective bypass circuits of the plurality of bypass circuits, wherein the plurality of bypass circuits are configured to control the plurality of multiplexors to select fills converted from copy back responses through the plurality of multiplexors to enqueue the fills in the second plurality of queues.

7. The system as recited in claim 6 wherein the plurality of bypass circuits are configured to control the plurality of multiplexors to select communications from the buffer when the fills are not present.

8. The system as recited in claim 1 wherein at least one of the plurality of coherent agents is a processor cluster that comprises one or more processors having caches.

9. The system as recited in claim 8 wherein the one or more processors comprise a plurality of processors, and wherein the processor cluster further comprises a shared cache coupled to the plurality of processors, wherein the shared cache is configured to respond to copy back requests received from the interconnect, and wherein the shared cache is configured to receive fills from the interconnect and write the received data to the shared cache, and to forward the data to a requesting processor of the plurality of processors.

10. An interconnect comprising a plurality of nodes to connect a plurality of agents including a memory controller and a plurality of coherent agents, wherein a first node of the plurality of nodes is a point in the interconnect at which packets from the plurality of coherent agents to the memory controller are merged, and wherein the first node comprises:
    a first plurality of queues, wherein the first node is configured to write packets received from a given coherent agent of the plurality of coherent agents to a given first queue of the first plurality of queues;
    a second plurality of queues, wherein the first node is configured to write packets to be transmitted to the given coherent agent to a given second queue of the second plurality of queues; and
    bypass circuitry coupled between the first plurality of queues and the second plurality of queues, wherein the bypass circuitry is configured to: detect a copy back response packet from a first coherent agent of the plurality of coherent agents that corresponds to a previous read request from a second coherent agent of the plurality of coherent agents, generate a fill packet for the second coherent agent including data from the copy back response packet, and write the fill packet to one of the second plurality of queues to transmit to the second coherent agent.

11. The interconnect as recited in claim 10 wherein the first node further comprises an arbitration circuit coupled to the first plurality of queues, wherein the arbitration circuit is configured to arbitrate among the packets in the first plurality of queues to select a first packet for transmission to the memory controller, thereby merging the packets from the plurality of coherent agents.

12. The interconnect as recited in claim 11 wherein the arbitration circuit is configured to select the copy back response packet for transmission to the memory controller, in addition to transmission of the fill packet to the second coherent agent.

13. The interconnect as recited in claim 10 further configured to receive packets from the memory controller to be transmitted to the plurality of coherent agents, and wherein the bypass circuitry comprises a plurality of multiplexors, wherein the bypass circuitry is configured to control the plurality of multiplexors to select fill packets generated from copy back response packets through the plurality of multiplexors to the second plurality of queues.

14. The interconnect as recited in claim 13 wherein the bypass circuitry is configured to control the plurality of multiplexors to select packets from other nodes in the interconnect to the plurality of coherent agents when the fill packets are not present.

15. A method, in a system comprising a plurality of processor clusters, a memory controller, and an interconnect coupled to the plurality of processor clusters and the memory controller, wherein the interconnect includes at least a first node at which communications from the plurality of processor clusters are merged to travel to the memory controller, the method comprising:
issuing a copy back request from the memory controller to a first processor cluster of the plurality of processor clusters responsive to detecting that the first processor cluster includes a modified copy of data requested by a read request from a second processor cluster of the plurality of processor clusters;
issuing a copy back response to the copy back request by the first processor cluster, including the copy of the data; and
converting the copy back response to a fill to the second processor cluster in the first node and transmitting the fill to the second processor cluster.

16. The method as recited in claim 15 further comprising transmitting the copy back response from the first node to the memory controller in addition to converting the copy back response to the fill.

17. The method as recited in claim 16 further comprising suppressing a second fill to the second processor cluster from the memory controller in response to receiving the copy back response from the first node.

18. The method as recited in claim 15 further comprising issuing the read request from the second processor cluster, wherein detecting that the first processor cluster has the modified copy is responsive to the read request.

19. The method as recited in claim 15 further comprising arbitrating among communications from the plurality of processor clusters in the first node to select communications to forward on the interconnect to the memory controller, thereby merging the communications.

20. The method as recited in claim 15 further comprising bypassing the fill by the first node to the second processor cluster and buffering, by the first node, another communication from the memory controller to the second processor cluster during the bypassing.

* * * * *